United States Patent
Burton

(10) Patent No.: US 8,402,294 B2
(45) Date of Patent: *Mar. 19, 2013

(54) MECHANISM FOR ADAPTIVELY ADJUSTING A DIRECT CURRENT LOADLINE IN A MULTI-CORE PROCESSOR

(75) Inventor: Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/653,906

(22) Filed: Dec. 21, 2009

(65) Prior Publication Data

US 2010/0169692 A1 Jul. 1, 2010

Related U.S. Application Data

(63) Continuation of application No. 11/416,535, filed on May 3, 2006, now Pat. No. 7,638,864.

(51) Int. Cl.
*G06F 1/26* (2006.01)
*G06F 1/32* (2006.01)
*G06F 1/00* (2006.01)

(52) U.S. Cl. ........ 713/324; 713/300; 713/320; 713/340; 323/234

(58) Field of Classification Search .......... 713/300, 713/320, 340, 324; 323/234
See application file for complete search history.

(56) References Cited

U.S. PATENT DOCUMENTS

| | | | | |
|---|---|---|---|---|
| 6,472,899 B2 * | 10/2002 | Osburn et al. | ................ | 702/64 |
| 6,680,604 B2 * | 1/2004 | Muratov et al. | ................ | 323/285 |
| 6,919,715 B2 * | 7/2005 | Muratov et al. | ................ | 323/285 |
| 7,093,140 B2 * | 8/2006 | Hsu et al. | ................ | 713/300 |
| 7,268,527 B2 * | 9/2007 | Horner | ................ | 323/285 |
| 2001/0045815 A1 * | 11/2001 | Muratov et al. | ................ | 323/280 |
| 2002/0084798 A1 * | 7/2002 | Osburn et al. | ................ | 324/765 |
| 2004/0003310 A1 * | 1/2004 | Hsu et al. | ................ | 713/320 |
| 2004/0090217 A1 * | 5/2004 | Muratov et al. | ................ | 323/282 |
| 2004/0117673 A1 * | 6/2004 | Arabi et al. | ................ | 713/300 |
| 2005/0154931 A1 * | 7/2005 | Oh | ................ | 713/300 |
| 2005/0270005 A1 * | 12/2005 | Horner | ................ | 323/283 |
| 2006/0069927 A1 * | 3/2006 | Wierzbicki | ................ | 713/300 |
| 2007/0033425 A1 * | 2/2007 | Clark | ................ | 713/320 |
| 2007/0118773 A1 * | 5/2007 | Tsuji | ................ | 713/300 |
| 2007/0220293 A1 * | 9/2007 | Takase | ................ | 713/320 |

OTHER PUBLICATIONS

Lee, K.; Yoa, K.; Zhang, X.; Qiu, Y.; Lee, F.C.; , "A novel control method for multiphase voltage regulators," Applied Power Electronics Conference and Exposition, 2003. APEC '03. Eighteenth Annual IEEE , vol. 2, no., pp. 738-743 vol. 2, Feb. 9-13, 2003.*

Non-Final Office Action mailed Dec. 29, 2008 for U.S. Appl. No. 11/416,535.

Final Office Action mailed Apr. 15, 2009 for U.S. Appl. No. 11/416,535.

Notice of Allowance mailed Aug. 7, 2009 for U.S. Appl. No. 11/416,535.

* cited by examiner

*Primary Examiner* — Thomas Lee
(74) *Attorney, Agent, or Firm* — Blakely, Sokoloff, Taylor & Zafman LLP

(57) ABSTRACT

A central processing unit (CPU) is disclosed. The CPU includes two or more processing cores and a power control unit to regulate voltage applied to the CPU based upon the number of processing cores that are active.

34 Claims, 6 Drawing Sheets

MECHANISM FOR ADAPTIVELY ADJUSTING A DIRECT CURRENT LOADLINE IN A MULTI-CORE PROCESSOR

RELATED APPLICATIONS

The present application is a Continuation of, and claims priority and incorporates by reference in its entirety, the corresponding U.S. patent application Ser. No. 11/416,535 filed May 3, 2006, and entitled, "MECHANISM FOR ADAPTIVELY ADJUSTING A DIRECT CURRENT LOADLINE IN A MULTI-CORE PROCESSOR," and issued as U.S. Pat. No. 7,636,864 on Dec. 22, 2009.

FIELD OF THE INVENTION

The present invention relates to computer systems; more particularly, the present invention relates to regulating voltage in a microprocessor.

BACKGROUND

Growing demand for integrated circuits (ICs), for example microprocessors, with ever higher levels of performance and functionality have driven these devices to circuit densities beyond 100 million transistors per die. This number may soon exceed one billion transistors on a single die. The growth in transistor density has been made possible by the use of MOSFET transistors with gate lengths below 100 nm. As gate length has shortened, power supply voltages have fallen, in some cases, to below 1 V.

Advances in transistor density have enabled the introduction of microprocessors with multiple processing cores. Given the continued transistor density advances, the likely trend will be towards microprocessors with ever increasing numbers of processing cores. The term "processing cores" need not refer to symmetric cores of uniform size and capability. In the most generic sense, "processing cores" can refer to any large block of incremental computational capability.

Advances in integrated circuit (IC) technology have led to significant increases in the operational frequencies of the IC. Typically, a manufacturer of an IC designs and guarantees the IC to operate properly up to a specification maximum operational frequency, if voltage supplied to the IC is within a targeted voltage range. Generally, to reduce power consumption, it is desirable to operate the IC near the lower end of the targeted voltage range.

In addition to being dependent on the applied voltage, the operational frequency of an IC may also be dependent at least in part on the temperature of the IC, the age of the IC, and/or other factors. Thus, various environmental limits, such as, but not limited to, temperature, voltage and so forth, are specified to facilitate a system designer to manage the usage of the IC, to ensure it functions properly. These environmental limits are typically conservatively specified (guardbanded) to accommodate among other things, aging of the IC. The level of conservatism (or magnitude of the guardband) varies from manufacturer to manufacturer, depending in part on the quality experience of the manufacturer.

A CPU operating at a given frequency will draw a variable amount of current depending on the type of instructions being executed. The variation in current produces self-induced voltage noise. Since processing cores are activated only as needed, there are times when there are very few cores activated, and other times when all the processing cores are activated. The magnitude of self-induced voltage noise increases as the number of activated processing cores increases.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for adaptively adjusting a loadline is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
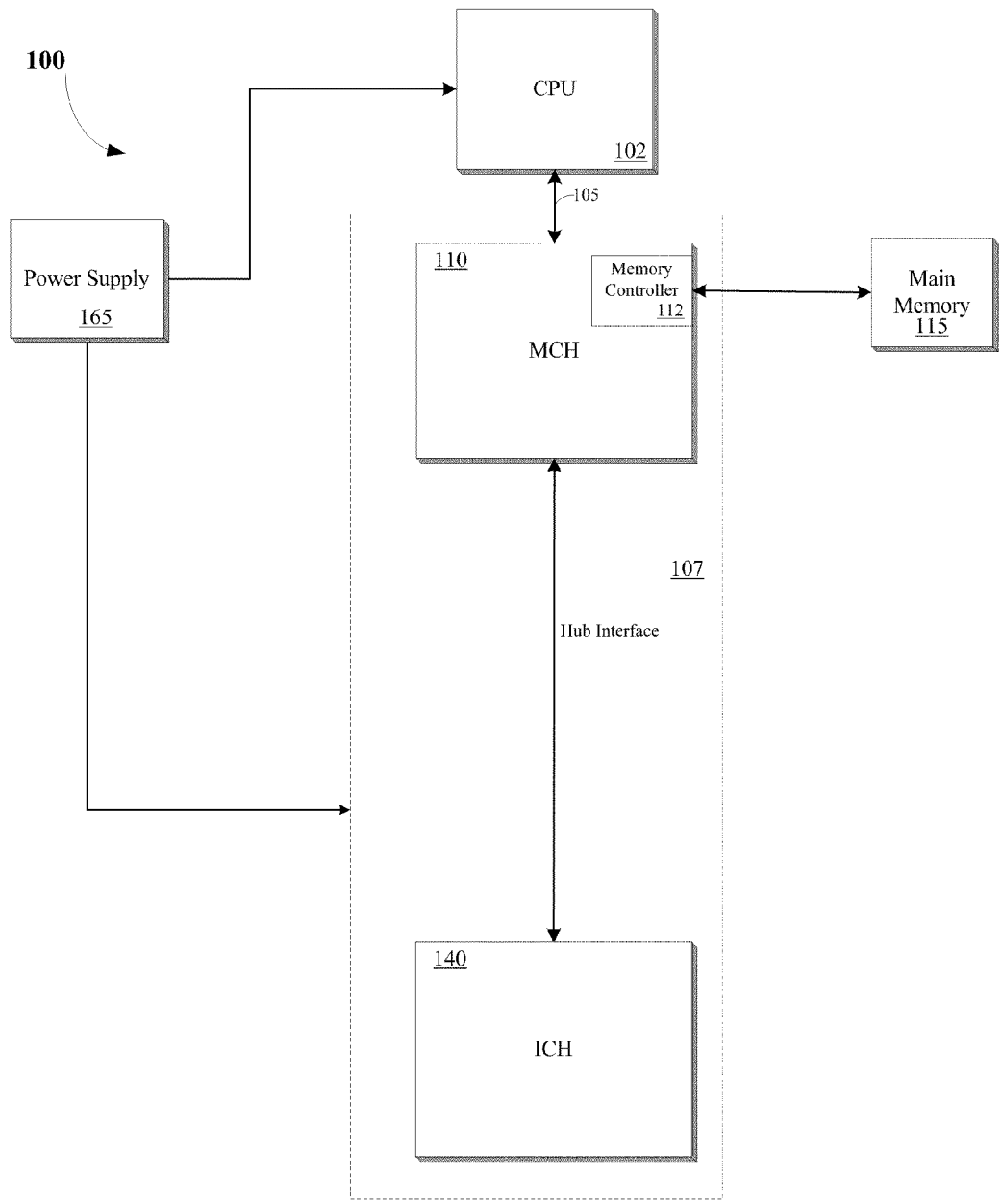
FIG. 1 is a block diagram of one embodiment of a computer system.

FIG. 1 is a block diagram of one embodiment of a computer system 100. Computer system 100 includes a central processing unit (CPU) 102 coupled to interconnect 105. In one embodiment, CPU 102 is a processor in the Itanium® family of processors including the Itanium® 2 processor available from Intel Corporation of Santa Clara, Calif. Alternatively, other CPUs may be used.

A chipset 107 may also be coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interconnect 105, such as multiple CPUs and/or multiple system memories.

MCH 110 is coupled to an input/output control hub (ICH) 140 via a hub interface. ICH 140 provides an interface to input/output (I/O) devices within computer system 100. In addition, computer system 100 includes a power supply 165 to provide power to CPU 102 and chipset 107.

Figure 2:
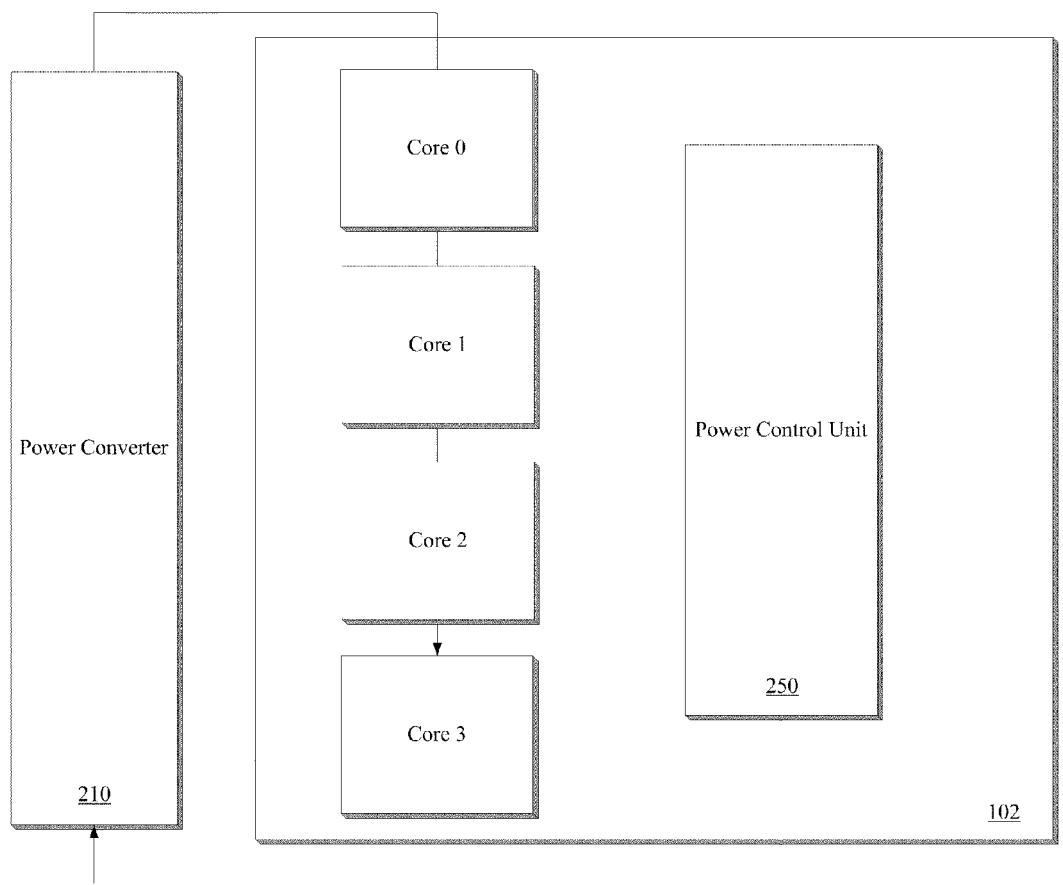
FIG. 2 illustrates a block diagram of one embodiment of a central processing unit.

FIG. 2 illustrates one embodiment of CPU 102 coupled to power converter 210. In one embodiment, power converter 210 is a programmable DC-to-DC (switch-mode) power converter located near the CPU 102 IC package to provide high power to CPU 102. However, in other embodiments, power converter 210 may be located on the CPU 102 package.

In a further embodiment, power converter 210 is a buck regulator that uses a DC input voltage as high as 48 V and provides a DC output voltage below 2 V (e.g., 1.2V). In one embodiment, power converter 210 uses switching frequencies in the neighborhood of 200 KHz. However in other embodiments, other switching frequencies may be implemented.

In yet further embodiments, power converter includes a handful of relatively large components, including a pulsewidth modulation (PWM) controller, one or more power transistors, filter and decoupling capacitors, and one or more large inductors and/or transformers.

CPU 102 includes processing cores 0-3 coupled to receive power from power converter 210, and a power control unit 250. Each processing core operates as an independent microprocessor to permit thread-level parallelism. Power control unit 250 regulates the voltage applied to CPU 102 by power converter 210, based at least in part on the potential of the operational frequency of all or a subset of the operational circuit(s) of CPU 102.

Each processing core creates self-induced power supply noise. This self-induced power supply noise is additive, since the decoupling capacitors are a shared resource, and the series resistance and series inductance of the power delivery network present a shared current path to the processing cores.

Figure 3:
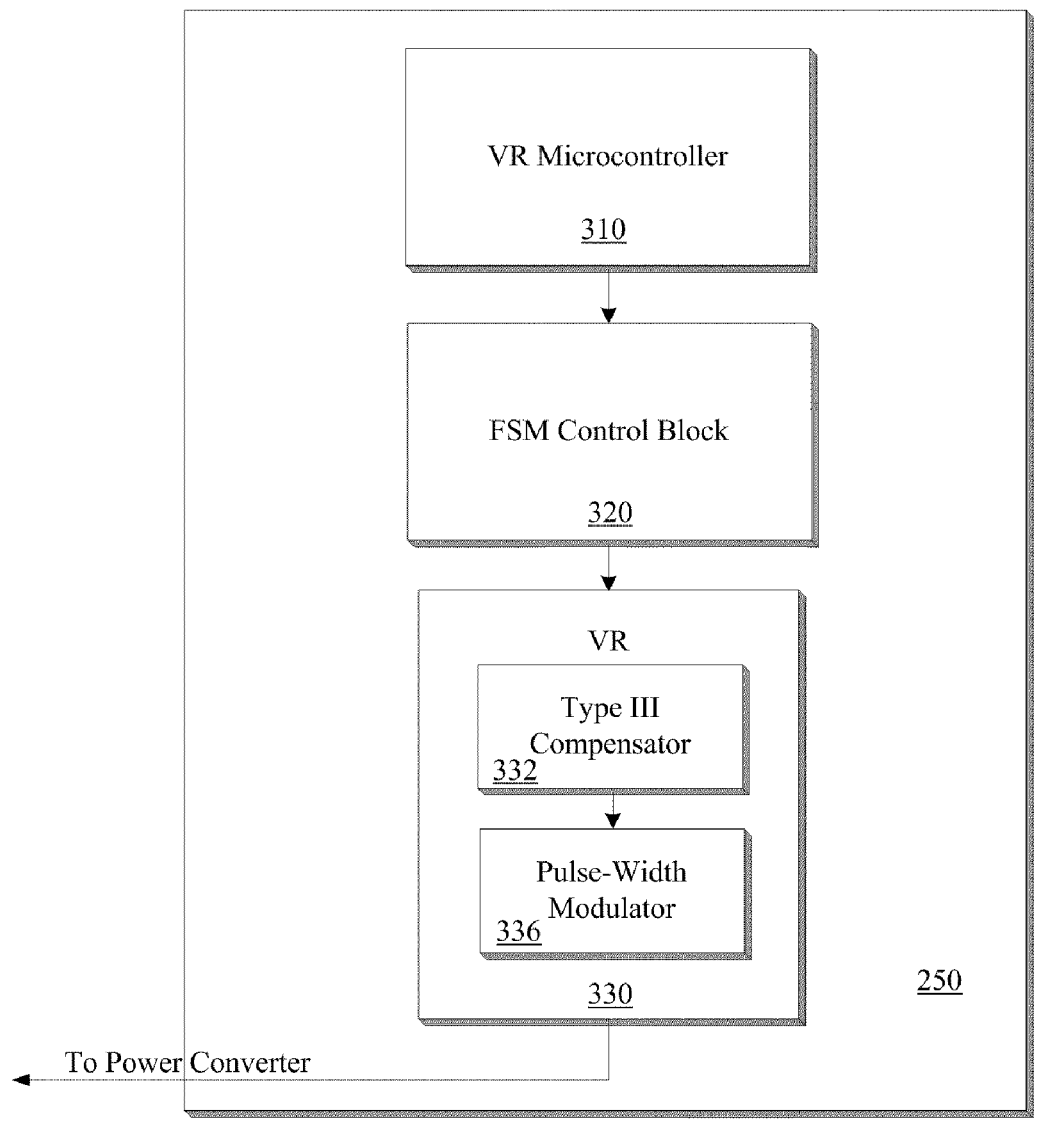
FIG. 3 illustrates a block diagram of one embodiment of a power control unit.

FIG. 3 illustrates one embodiment of power control unit 250. Power control unit 250 includes a voltage regulator (VR) microcontroller 310, a finite state machine (FSM) control block 320 and a VR 330. VR microcontroller 310 provides voltage control configuration parameters that are implemented to control voltage. According to one embodiment, VR microcontroller 310 provides the configuration parameters via input/output (I/O) writes to addresses to add coefficients that define voltage control functionality.

VR 330 includes a compensator 332 and a pulsewidth modulator 336. The compensator receives a target voltage from control block and compares the target voltage to an actual voltage received from one or more of the cores 0-3, or from a common sense point in the current path to the cores. In response compensator 332 generates an error term that is used to drive to zero error using negative feedback. Pulsewidth modulator 336 generates pulse signals to control current based upon the error term received from compensator 332.

FSM control block 320 implements various FSMs to control various voltage control parameters. In one embodiment, FSM control block 320 includes ramp rate control, dynamic current calculation, and loadline voltage adjustment. In a further embodiment, FSM control block 320 adaptively adjusts the DC loadline at a minimum current intercept voltage high enough to deliver a requisite voltage whenever CPU 102 operates in a guaranteed performance state. Thus, the voltage setpoint is set adaptively based on the amount of noise expected, and based on the goals of a particular operating state.

The loadline is a mechanism to linearly lower core voltage when CPU 102 draws large current, which minimizes the power drawn at the maximum CPU current. The loadline also protects against violating a speed-bin voltage (e.g., the minimum voltage at CPU 102 at a given frequency) when CPU 102 goes from zero activity (minimum current) to maximum activity (maximum current) due to a downward spike in voltage. In addition, the loadline protects against violating a maximum reliability voltage when CPU 102 goes from maximum activity to zero activity due to an upward spike in voltage.

According to one embodiment, FSM control block 320 calculates the dynamic current of CPU 102 based upon the number of cores that are activated, and their respective operating frequencies. Further FSM control block 320 uses the calculated dynamic current to calculate AC voltage noise. Once the AC voltage noise has been calculated, FSM control block 320 may optimally position the DC loadline at the minimum current intercept just high enough to deliver the requisite voltage to operate at the present frequency. In one embodiment, the loadline is positioned at the minimum current intercept by adaptively moving the minimum current intercept, and adaptively adjusting a DC loadline resistance if needed.

Figure 4:
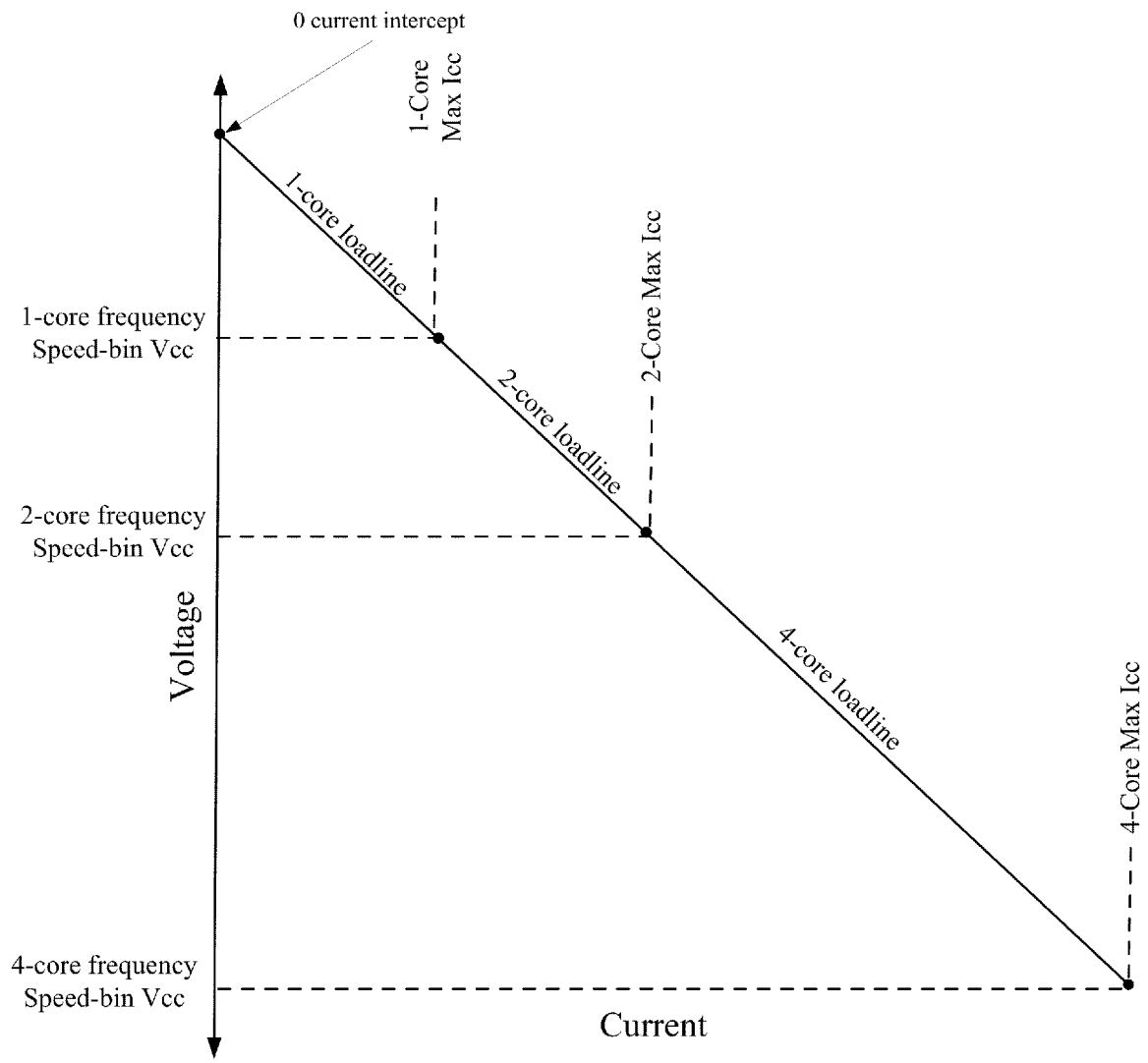
FIG. 4 illustrates one embodiment of a graph of a loadline for operation of four processing cores.

FIG. 4 illustrates one embodiment of a graph of a loadline for CPU 102. As shown in FIG. 4, CPU 102 loadline operates at a maximum current (e.g., 4-core Max Icc) whenever all four processing cores are in operation (4-core loadline). However, when only two processing cores are in operation the 2-core loadline has a maximum current approximately one-half of the 4-core Max Icc and approximately one-half the voltage drop of the 4-core loadline. Similarly, when one processing core in operation the 1-core loadline has a maximum current approximately one-fourth of the 4-core Max Icc and one-fourth the voltage drop of the 4-core loadline.

Some operating systems can instruct the microprocessor to operate in a maximized performance mode. When in this state, the loadline of FIG. 4 can be used to increase the frequency (and hence, performance) when a subset of the available cores are enabled. Since many performance-critical applications are still single-threaded, this capability can yield a very valuable performance increase.

Figure 5:
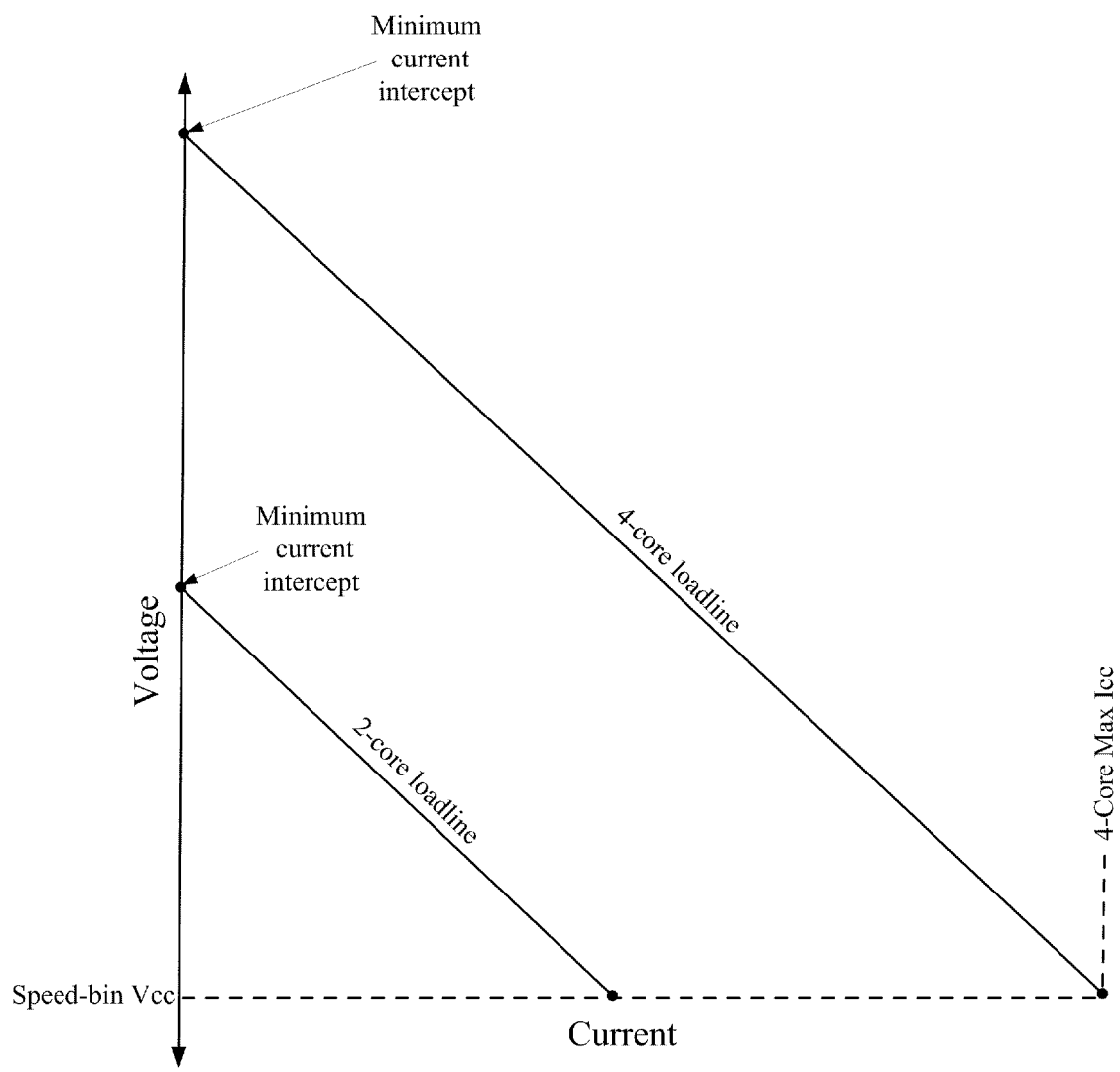
FIG. 5 illustrates one embodiment of a graph of a loadline for operation of two processing cores.

Often the operating system will instruct the microprocessor to enter a constant performance mode (rather than the maximized performance, which is inherently variable). While in constant performance mode, rather than carrying out 1-core and 2-core operation at higher frequencies, CPU 102 may operate at a lower voltage setpoint at the same frequency (or Speed-bin Vcc). Thus, FSM control block 320 adjusts the loadline to a minimum current intercept voltage as described above. FIG. 5 is a graph illustrating one embodiment of a 4-core loadline and a 2-core loadline adjusted by FSM control block 320.

Figure 6:
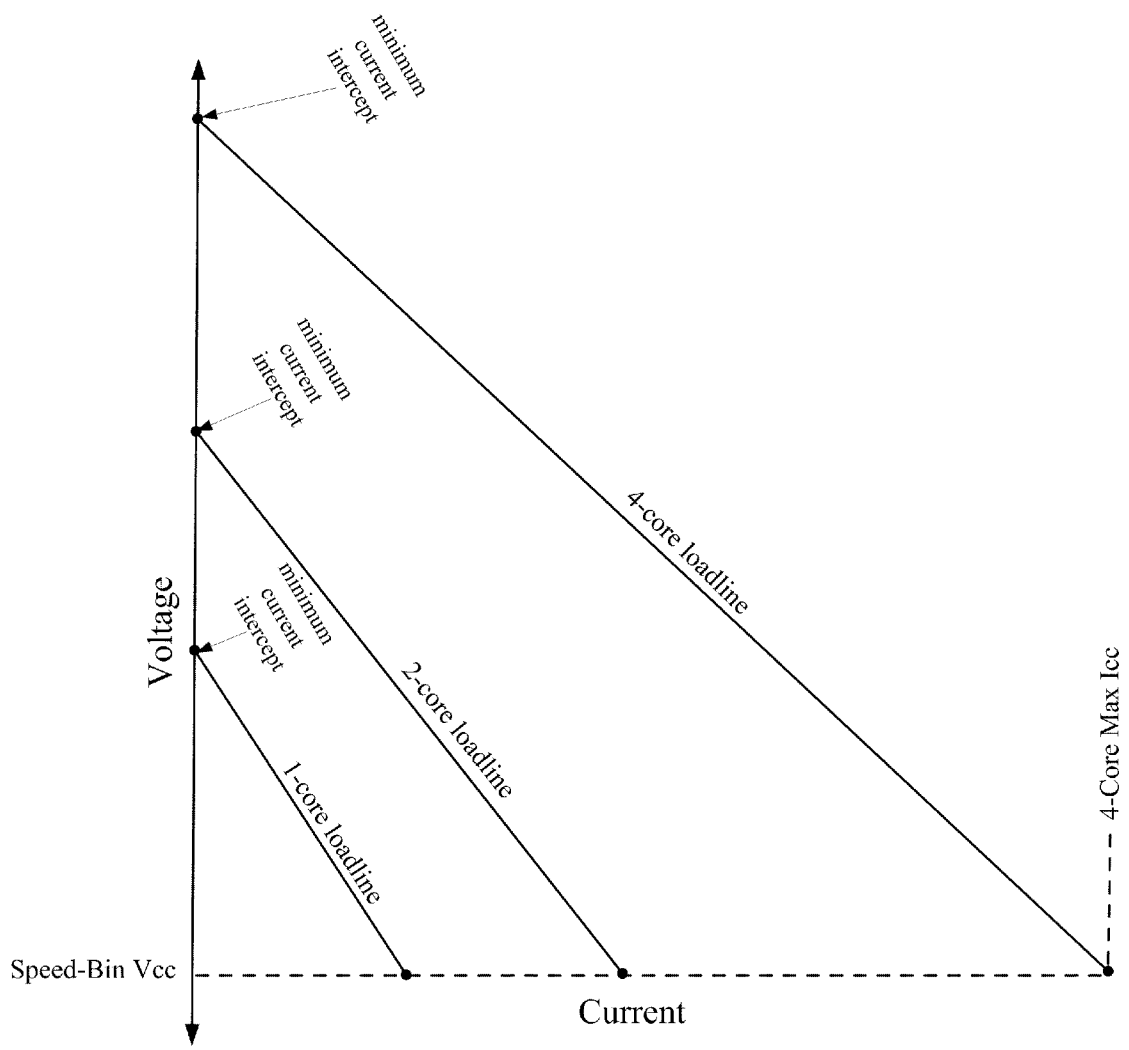
FIG. 6 illustrates one embodiment of a graph of a loadline for operation of one processing core.

As shown in FIG. 5, the 2-core loadline has been adjusted to a lower zero current intercept voltage. FIG. 6 is a graph illustrating one embodiment of a 4-core loadline, a 2-core and a 1-core loadline, where the 1-core loadline has been adjusted to an even lower zero current intercept voltage by FSM control block 320. FIG. 6 shows an embodiment wherein both the loadline slope and the loadline intercept are functions of the number of active cores. Since most applications operate on the CPU 102 use only 1-core, the CPU will mostly operate at the lower voltage.

In a further embodiment, the slope may be adaptively adjusted to deliver the same speed-bin voltage with the same minimum current intercept, independent of the number of cores. In such an embodiment, the slope for 4core operation is R. For the operation of a lower number of cores the slope is increased. For instance, the slope for 3core operation is approximately $4/3*R$, 2R for 2core operation and, 4R for 1core operation.

Moreover, operating at the lower voltages for 1-core and 2-core operation results in lower power and increased CPU 102 reliability, since the reliability of gate oxides of the CPU 102 transistors are exponentially degraded by voltage and temperature. Modern operating systems generally manage the computational resources based on the needs of the applications being run. These operating systems trade off CPU performance for CPU efficiency based on the compute demands of the present workload The operating system generally manages CPU power/performance tradeoffs using CPU power states. Some CPU states dictate maximum performance, while others deliver guaranteed performance at a somewhat improved efficiency, and still other states trade off varying amounts of performance for corresponding improvements in power/performance efficiency.

Therefore, CPU 102 may also operate in a maximized performance state. In the maximized performance state the minimum-current intercept voltage may remain constant for lower core operation (e.g., 2-core and 1-core), while FSM control block 320 adjusts the minimum voltage upward, and the frequency upward in a corresponding manner (as in FIG. 4).

The above-described mechanism yields a decrease in voltage and power for most of the CPU operation, which will allow the voltage to be opportunistically increased during periods requiring peak performance. Further, the mechanism will yield an increase in single-thread performance during the peak performance state, with an opportunistic decrease in power during lower performance states.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A central processing unit (CPU) comprising:
    two or more processing cores; and
    a power control unit to:
        calculate dynamic current for the CPU based on a number of processing cores that are active and an operating frequency of the two or more processing cores that are active, and
        regulate voltage applied to the CPU by adaptively adjusting a direct current (DC) loadline of the CPU based on the dynamic current.

2. The CPU of claim 1, wherein the power control unit to adjust the loadline to a first minimum current intercept voltage if one processing core of the two or more processing cores, is active and to adjust the DC loadline to a second minimum current intercept voltage if two processing cores, of the two or more processing cores, are active.

3. The CPU of claim 2, wherein the power control unit to raise the second minimum current intercept voltage relative to the first minimum current intercept voltage.

4. The CPU of claim 1, wherein the power control unit to adjust a slope or resistance of the DC loadline based on the number of processing cores that are active.

5. The CPU of claim 4, wherein the power control unit to lower the resistance of the DC loadline as the number of processing cores that are active is increased.

6. The CPU of claim 1, wherein an operating frequency is lowered as the number of processing cores that are active is increased.

7. The CPU of claim 1, wherein the power control unit to lower a resistance of the DC loadline and to raise a minimum current intercept voltage as the number of processing cores that are active is increased.

8. The CPU of claim 1, wherein the power control unit comprises:
    a microcontroller to provide configuration parameters; and
    a control block to calculate the dynamic current for the CPU based on the number of processing cores that are active and an operating frequency of the processing cores that are active.

9. The CPU of claim 8, wherein the control block to calculate transient voltage noise based on the dynamic current.

10. The CPU of claim 8, wherein the control block to adjust the DC loadline to a minimum current intercept sufficient to deliver voltage to operate one or more processing cores at a present frequency.

11. The CPU of claim 8, wherein the control block to adjust the DC loadline to a minimum current intercept sufficient to deliver substantially a same minimum voltage for any number of processing cores that are active.

12. The CPU of claim 8, wherein the power control unit comprises a voltage regulator.

13. The CPU of claim 12, wherein the voltage regulator comprises:
    a type III compensator; and
    a pulse width modulator.

14. The CPU of claim 1, wherein the power control unit is operable to adaptively adjust the DC loadline based on an amount of expected noise.

15. The CPU of claim 1, wherein the power control unit is operable to calculate dynamic current to calculate AC voltage noise.

16. The CPU of claim 15, wherein the power control unit is operable to adjust the DC loadline in response to calculating the AC voltage noise.

17. The CPU of claim 1, wherein the power control unit is operable to adaptively adjust the DC loadline according to instructions from an operating system.

18. The CPU of claim 1, wherein the power control unit is operable to adaptively adjust the DC loadline to deliver a same speed-bin voltage with a same current intercept independent of number of processing cores.

19. The CPU of claim 1, wherein the power control unit comprises:
    a voltage regulator;
    a finite state machine control unit; and
    a voltage regulator microcontroller.

20. A method comprising:
    determining a number of processing cores that are active in a central processing unit (CPU);
    calculating dynamic current for the CPU based on a number of processing cores that are active and an operating frequency of the processing cores that are active; and
    adjusting a direct current (DC) loadline of the CPU based upon the dynamic current.

21. The method of claim 20, wherein determining the operating frequency of the processing cores that are active prior to adjusting the DC loadline.

22. The method of claim 20 further comprising:
    calculating transient voltage noise based on the dynamic current.

23. The method of claim 20 further comprising:
    adjusting the DC loadline to a minimum current intercept sufficient to deliver substantially a same minimum voltage for any number of processing cores that are active.

24. The method of claim 20 further comprising:
    adjusting resistance of the DC loadline sufficient to deliver substantially a same minimum voltage for any number of processing cores that are active.

25. The method of claim 22 further comprising:
increasing the DC loadline to a minimum current intercept as the number of processing cores that are active increases; and
decreasing a resistance of the DC loadline as the number of processing cores that are active increases.

26. The method of claim 20 further comprising:
decreasing a resistance of the DC loadline; and
decreasing the operating frequency as the number of processing cores that are active increases.

27. A computer system comprising:
a power converter;
a central processing unit (CPU), coupled to the power converter, including:
two or more processing cores; and
a power control unit to:
calculate dynamic current for the CPU based on a number of processing cores that are active and an operating frequency of the two or more processing cores that are active, and
regulate voltage applied to the CPU by adaptively adjusting a direct current (DC) loadline of the CPU based on the dynamic current; and
a memory device coupled to the CPU.

28. The computer system of claim 27, wherein the power control unit to adjust the DC loadline at a first minimum current intercept voltage if one processing core, of the two or more processing cores, is active and to adjust the DC loadline at a second minimum current intercept voltage if two processing cores, of the tow or more processing cores, are active.

29. The computer system of claim 27, wherein the power control unit comprises:
a microcontroller to provide configuration parameters; and
a control block to calculate the dynamic current for the CPU based on the number of processing cores that are active and an operating frequency of the processing cores that are active.

30. The computer system of claim 29, wherein the control block to calculate transient voltage noise based on the dynamic current.

31. The computer system of claim 29, wherein the control block to adjust the DC loadline to a minimum current intercept sufficient to deliver substantially a same minimum voltage for any number of processing cores that are active.

32. The computer system of claim 29, wherein the control block to adjust the DC loadline to a minimum resistance sufficient to deliver substantially a same minimum voltage for any number of processing cores that are active.

33. The computer system of claim 29, wherein the control block to adjust both the DC loadline to a minimum current intercept and to adjust a slope of the DC loadline sufficient to deliver substantially a same minimum voltage for any number of processing cores that are active.

34. The computer system of claim 27, wherein the CPU to decrease the operating frequency and to decrease a slope of the DC loadline as the number of processing cores that are active increases.

* * * * *